L. A. SUBERS.
PROCESS AND MECHANISM FOR CONTINUOUSLY SOLIDIFYING AND VULCANIZING COATING COMPOUNDS.
APPLICATION FILED AUG. 25, 1919.
1,411,593.
Patented Apr. 4, 1922.
7 SHEETS—SHEET 4.
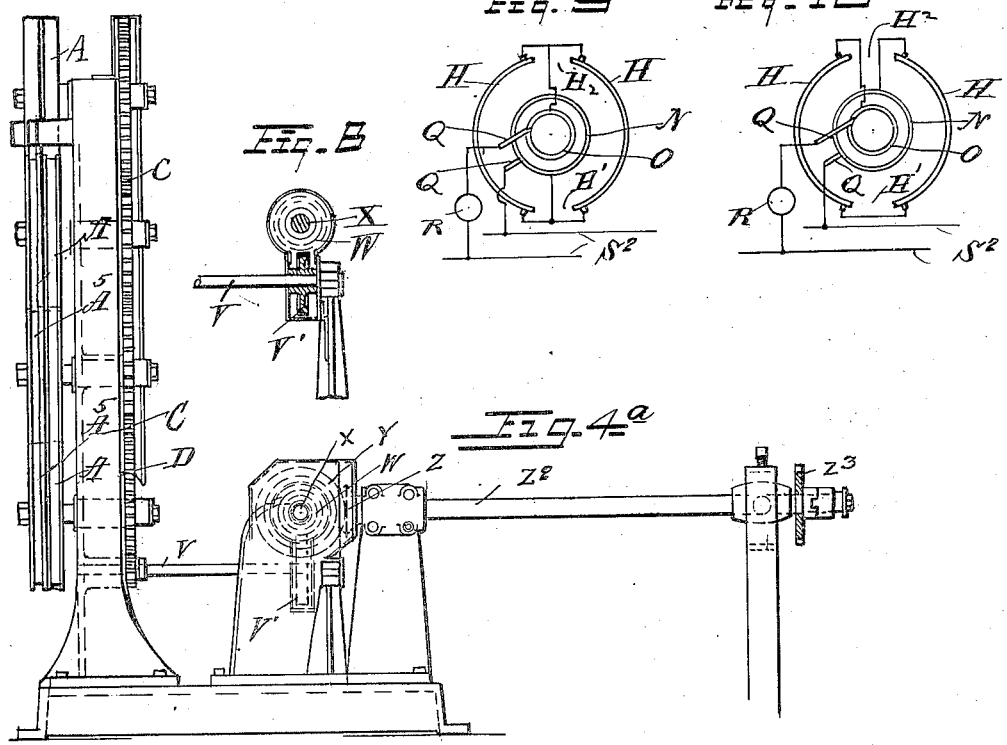
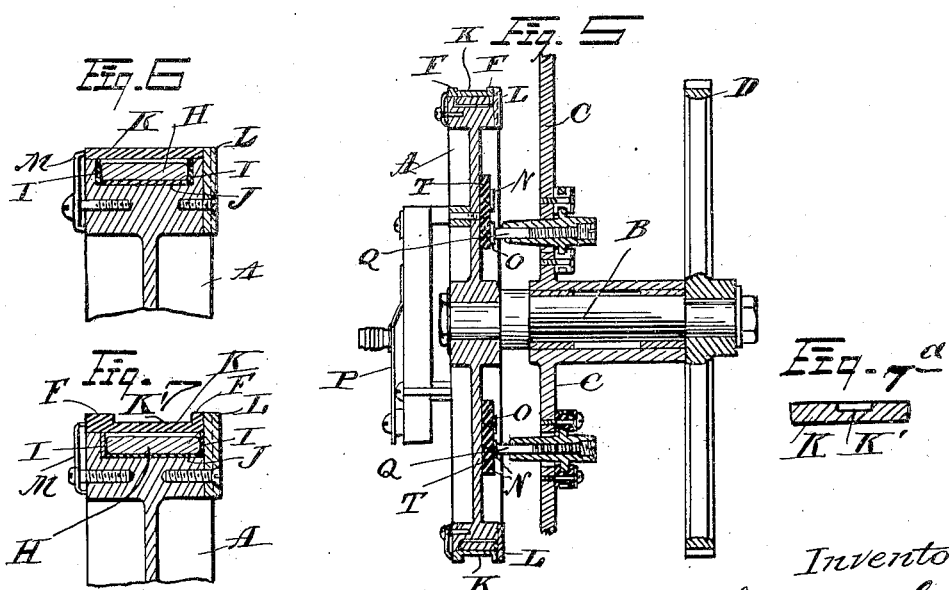

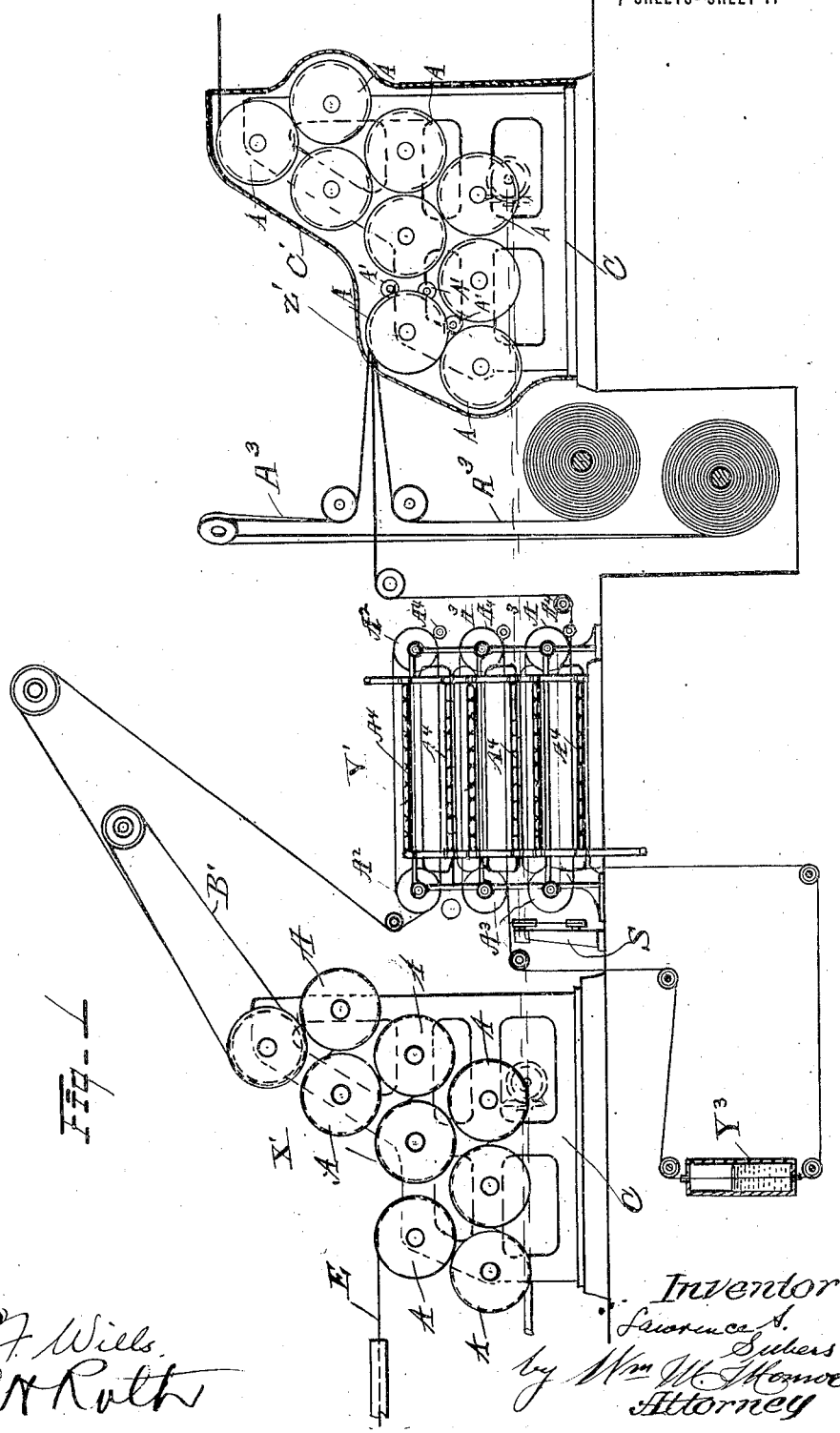

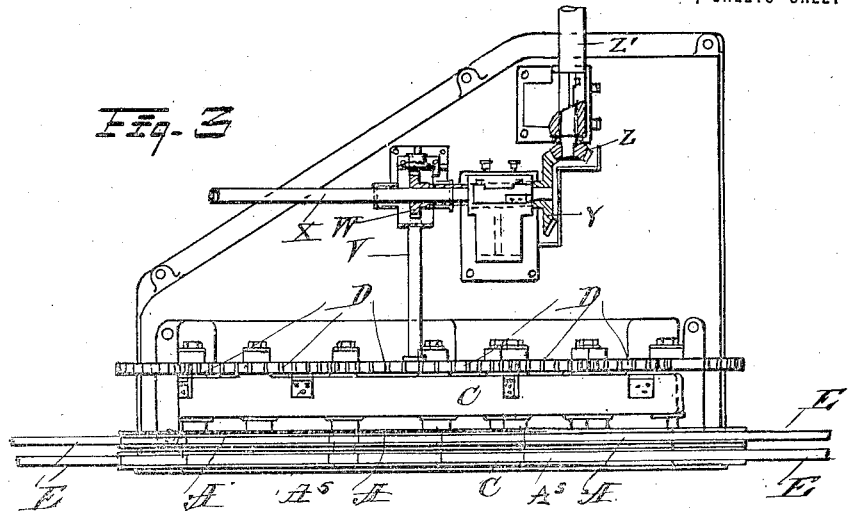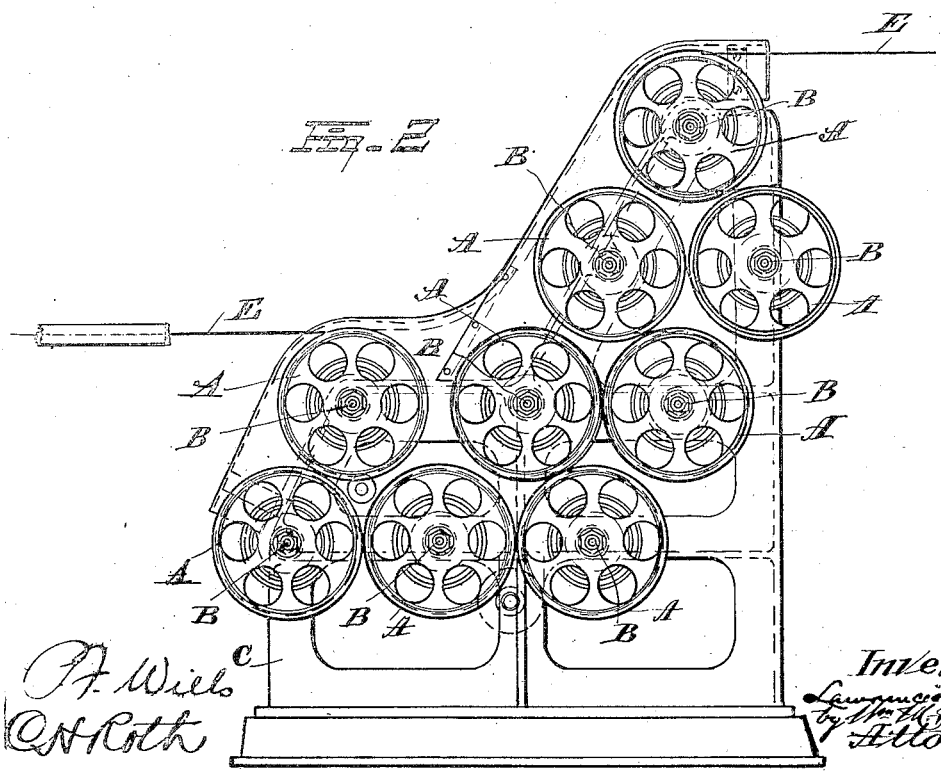

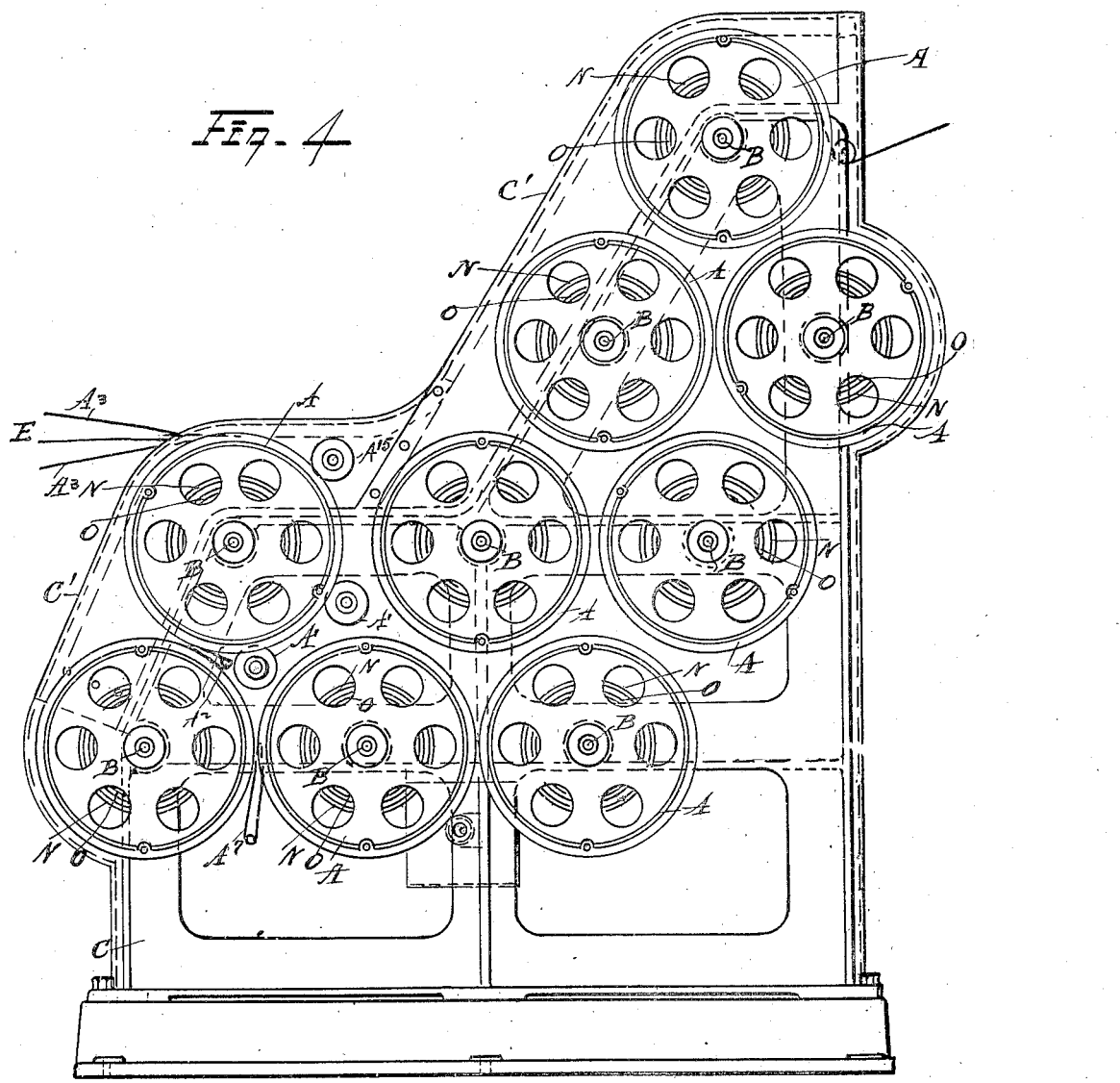

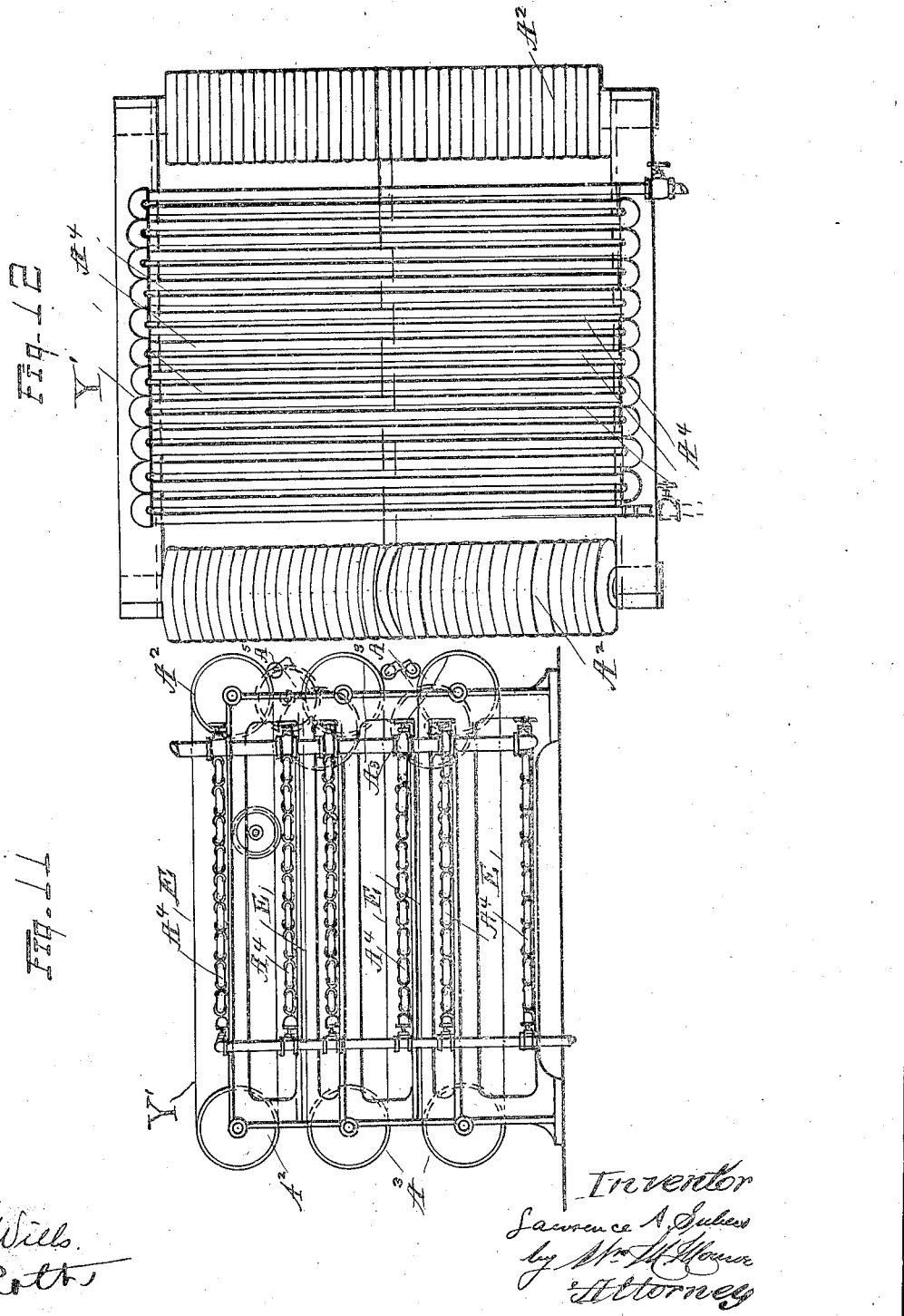

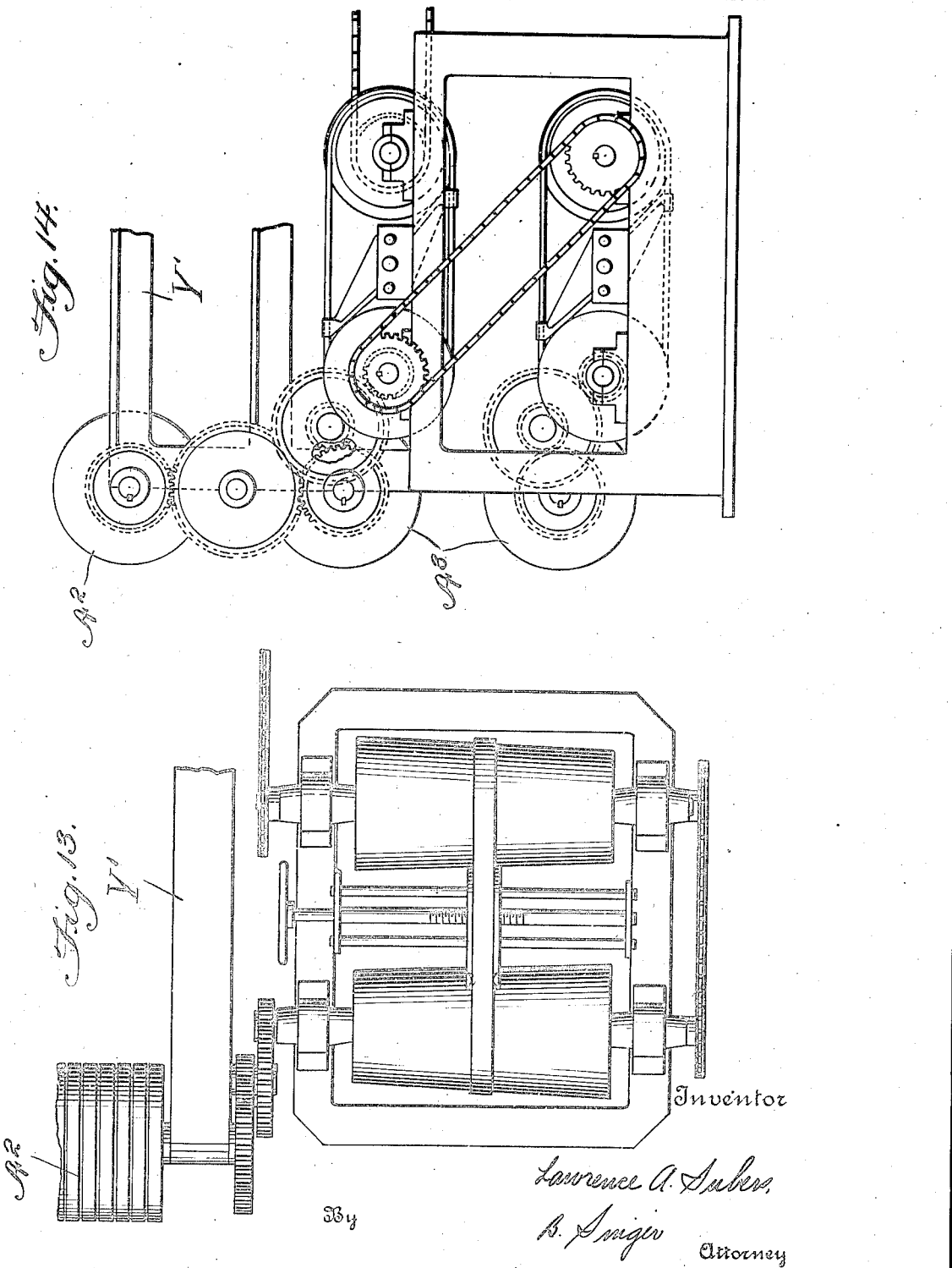

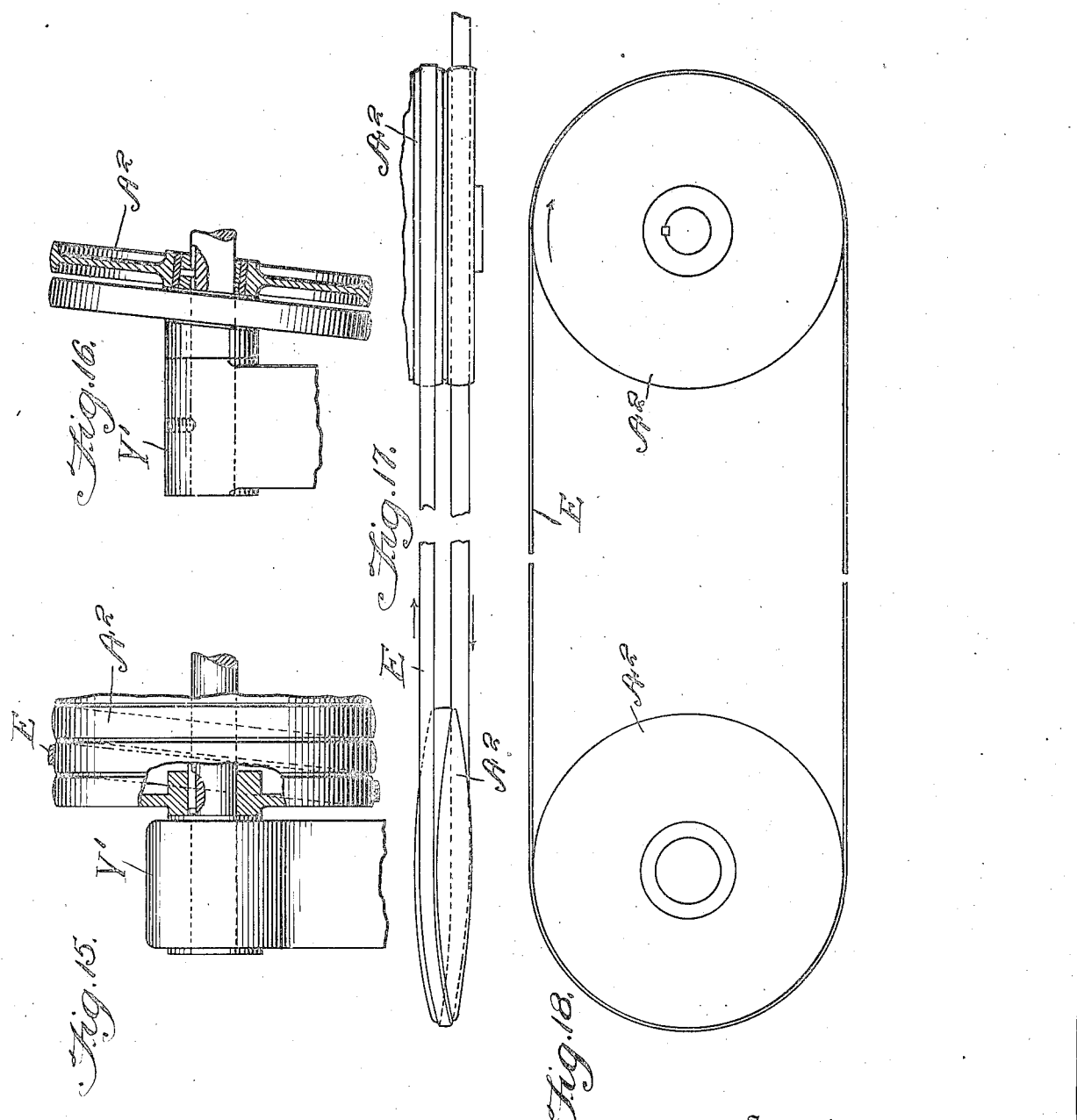

UNITED STATES PATENT OFFICE.

LAWRENCE A. SUBERS, OF LAKEWOOD, OHIO.

PROCESS AND MECHANISM FOR CONTINUOUSLY SOLIDIFYING AND VULCANIZING COATING COMPOUNDS.

1,411,593. Specification of Letters Patent. Patented Apr. 4, 1922.

Application filed August 25, 1919. Serial No. 319,728.

*To all whom it may concern:*

Be it known that I, LAWRENCE A. SUBERS, a citizen of the United States, and resident of Lakewood, in the county of Cuyahoga and State of Ohio, have invented certain new and useful Improvements in Processes and Mechanism for Continuously Solidifying and Vulcanizing Coating Compounds, of which I hereby declare the following to be a full, clear, and exact description, such as will enable others skilled in the art to which it appertains to make and use the same.

The objects of the invention are to provide a continuous process and continuously acting mechanism for treating the laminated cohesive interwound tubular fabric band described in my prior Letters Patent No. 1,017,271, dated Feb. 13, 1912, having both inner and outer coatings of vulcanizable materials which may consist of rubber and other materials in the form of a ribbon or otherwise, constructed by means of a machine described in Letters Patent, No. 1,188,571, granted June 27th, 1916, and No. 1,192,017, granted July 25th, 1916, by this means to enable the manufacturer to turn out large quantities of finished goods in a very short time, and to give a uniform treatment to all parts of the product.

This invention particularly applies to a continuous process for evaporating the solvents and partially solidifying, drying, compressing and finally vulcanizing the same while in transit through successively operated mechanisms.

Heretofore goods have been vulcanized by treating one portion or specimen at a time, and rubbered fabrics of great length have been treated slowly and with great difficulty, one part at a time; and no gaps in the product between portions could be permitted if uniform vulcanization was to be accomplished.

In the improved process and mechanism, in accordance with my invention, the fabric is first passed continuously over a series of rolls in the periphery of each one of which is enclosed a heating unit, preferable electrical, and under perfect and separate control, and by means of which the degree of heat applied to the rubber goods or fabric, can during its progress through the machine, be predetermined and carefully regulated at any point therein.

In this portion of the machine the solvents contained in the rubber compound are evaporated and a certain degree of solidification is accomplished.

The solvents can be reclaimed by any well known method if desired after the band has passed over a predetermined number of heated rolls.

It then passes over a conveyer on the last roll which passes under the band and upon which it is exposed to the open air for a predetermined length of time, where the atmospheric action on the coating further hardens them so that the bands will not stick to the drying and compressing rolls over which the material next passes and while passing between these rolls it is subjected to further heat treatment by exposure to hot air currents which further remove any solvents that may remain in the band and the band is also subjected while passing over these rolls to a certain amount of pressure by means of pressure rolls to drive out any gases included in the substance of the band or its coatings and to further solidify and compact the material.

A variable speed mechanism regulated the rate of speed of the conveyer and the upper or first two series of the drying rolls to compensate for the shrinkage caused by the tension on the yarns of the fabric and adding the compound thereto, also a variable speed mechanism is introduced to increase the rate of speed of the later acting or lower series of drying rolls to accommodate a certain amount of stretching caused by the stretching action of the recoating compound through which the band passes before it is secured upon the lower series of rolls in the heating and compressing mechanism.

The compression rolls are mechanically propelled at the same rate of speed as the material passing between the contacting rolls. The next feature of the process is to pass the fabric after recoating through a multiple number of individually heated vulcanizing rolls in which the degree of heat applied is sufficient to vulcanize the coatings and at this step of the process one or more exterior layers of vulcanizable material may be applied if desired and vulcanized upon the band. The speed of the final vulcanizing rolls must be equal to that of the last or lower series of rolls of the drying and compressing mechanism. The several mechanisms illustrated herein for performing the different steps of this process can be used also singly or in any combination desired to perform any part of the process. For instance, the vulcanizing mechanism can be used alone to treat a rubbered product or the steps of the process leading up to vulcanization can be used alone if desired.

When it is desired to produce vulcanized fabric interlaid with vulcanizable and adhesive material, the entire process includes first coating the band with the liquid adhesive as shown in Letters Patent No. 1,017,271, second evaporating the solvents and solidifying the coatings, third exposing the band to the atmosphere for a short time to further dry and harden the coatings, fourth passing the band over steam or other heat and compressing the same to eliminate gases embedded in the coatings and material and finally vulcanizing the adhesive material under pressure, these steps being accomplished during the transit of the band through successively acting mechanisms by which the several acts are accomplished, and after which the completed material is delivered from the machine.

The process of vulcanizing is exemplified in the treatment of a tubular fabric band internally and externally coated with rubber or cement or both and illustrated in the accompanying drawings which disclose operatively connected mechanisms for continuously treating the fabric band from the time of its delivery from the band making and coating devices until completely vulcanized.

In the accompanying drawings Fig. 1 is a side elevation of preferred forms of mechanism for continuously treating and vulcanizing the material;

Fig. 2 is a side elevation of the portion of the machine that receives the liquid solution;

Fig. 3 is a plan thereof;

Fig. 4 is a side elevation on a larger scale, of the vulcanizing portion of the machine.

Fig. 4ª is an edge view of the same;

Fig. 5 is a transverse section, enlarged, of one of the rolls, showing the electrical unit therein, and the brushes for taking off the electrical current;

Figs. 6 and 7 are enlarged sectional details of the bearing edges of the rolls, and the electrical units and insulating means therefor;

Fig. 7ª is a detail sectional view of the same;

Fig. 8 is a detail transverse section of the driving mechanism for the rolls;

Fig. 9 is a diagram illustrating the electric wiring for use with a current of 110 volts D. C. or A. C. and Fig. 10 is a similar wiring diagram for a current of 220 volts D. C. or A. C.;

Fig. 11 is a side elevation of the heating table and Fig. 12 is a plan thereof.

Figure 13 is a detail plan of suitable variable speed mechanism for use in connection with my improved apparatus.

Figure 14 is an elevation of the same and of the heating chamber mechanism.

Figures 15 and 16 are detail elevations, partly in section, of the crown fields $A^2$ and coated band.

Figure 17 is a detail top plan of the same.

Figure 18 is a detail elevation of the same.

When it is desired to produce vulcanized fabric interlaid with vulcanizable and adhesive material, the entire process including first, coating the fabric bands with liquid adhesive, next eliminating the solvents therefrom, next drying and hardening the coatings and finally pressing the materials the same together and vulcanizing the adhesive material, is accomplished by my continuously acting mechanism in which the several acts are accomplished in succession, after which the completed material is wound up and delivered from the machine. This complete process mechanism is illustrated in Fig. 1 where X' is the mechanism for eliminating solvents, Y' is the mechanism for drying and hardening the coating, and Z' is the vulcanizing mechanism.

The mechanism X' and Z' are similar in every respect except that the pressure rolls are omitted from the mechanism X'. In practice a suitable enclosure confines the heat generated by the preferably electrically heated rolls.

Both contain separately adjusted heating units for each roll.

In Figs. 1, 2, 3, and 4 the mechanism X' is illustrated.

In the views A A A are a series of rolls, of equal size, which are mounted upon shafts B B B in a vertical frame C, and connected to revolve at an equal rate of speed by means of spur gears D D D.

A band, E, of rubber or rubbered fabric, combined or not combined with fabric bands, E', E², is passed over the edge over the first roll, A, shown in Fig. 4, and it is then passed in turn over all the rolls until the amount of heat required has been applied equally to every portion of the band.

All the rolls excepting the last roll of each set are provided with marginal flanges, F, F, which retain the band upon its seat and the band is pressed into close contact with certain of the rolls by means of pressure rolls A′ associated with as many of the rolls A as may be deemed necessary.

The band in passing over the first roll is heated upon one side by said roll and when passed over the next roll, the reverse side is heated by the last named roll, the amount of space intervening between the surfaces of the rolls being so small that the effect is negligible, and the treatment is practically a continuous one.

The unvulcanized fabric is removed from the last roll of the mechanism, by means for the endless band B′. The heating units H, H, are arcuate in form and as shown in Figs. 6 and 7, are embedded in the insulation I, within the marginal groove, J, in the periphery of each roll. An enclosing casing of suitable construction is also in practice employed to retain the heat adjacent to the fabric while it is passing through the machine.

The peripheral margins, K, K, of the rolls are rings of polished metal to which the rubbered fabric does not adhere, and are secured by means of the annular plates I, and clamping members M. To close the circuit through each annular electric unit, each roll is provided with the annular contact bands N, and O, from which the current is led to the unit H, which is preferably divided diametrically at H, $H^2$, to provide polarity. The contact bands are insulated at T. A diagram of the wiring for a current of 110 volts is shown in Fig. 9, and a similar diagram for a current of 220 volts is shown in Fig. 10.

A separate switch for closing and breaking the circuit is shown at P, in each roll. The brushes are shown at Q, and a regulator is indicated conventionally at R, to modify the heat to the exact degree required.

The several heating units on the entire series of rolls are respectively connected into the main circuit, $S^2$ and any number of rolls with their several connections separately adjusted to the desired voltage may be connected in the main circuit way.

The small regulator furnished for each roll should be connected in the series with one brush to the line as indicated.

The heating units are carefully insulated to prevent making electrical connections with the rim or roll, and no ground current to the frame should be permitted.

The brushes Q are spring pressed, and mounted in insulated seats. Means for driving the rolls as shown in Figs. 1, 2, and 3, where V is a driving shaft of a roll of each of the mechanisms X′, Z′, and has a worm wheel V′ thereon.

W is a worm, upon the connecting shaft X, adjacent thereto, Y is a bevel gear on the shaft X, driven by the bevel pinion Z upon the main driving shaft $Z^2$; $Z^3$ is a sprocket wheel thereon, for engagement by an endless driving chain.

In this manner a great reduction in speed is provided which can be regulated by changing the speed of the shaft X to which the motive power is applied, preferably by connecting to a variable speed motor by gears or belts, thereby changing the speed of the whole machine proportionately, since the timing of the passing of the band to eliminate solvents is dependent upon the thickness of the fabric band and its coating.

After leaving the heating rolls of mechanism X′ the carrier B′ removes the band therefrom and exposes it to the air to dry and solidify the moist surface. The next step in the process is accomplished by means of the heating table or mechanism Y′ shown in Figs. 1, 11 and 12 in which the coated band E is passed continuously over the crowned wheels at an angle in upper and lower sets, $A^2$, $A^3$, respectively.

The band passes over these wheels continuously from end to end of the table or frame and is exposed to hot air from steam pipes $A^4$, $A^4$ which eliminates any remaining solvents and hardens the coating material therefrom; pressure rolls $A^5$, $A^5$ compress the band and force out any solvents retained within these bodies.

The band is received from the carrier upon the upper wheel at a slightly lower rate of speed than that of the mechanism X′ since some shrinkage has taken place from solidifying, and the tendency of the yarns to return to their normal position.

The lower sets of rolls however run at a slightly higher rate of speed since the band stretches somewhat in passing through a recoating device $Y^3$, which applies a predetermined additional amount of coating compound to the outer sides of the band.

Thence a band passes to the mechanism Z′ which is a vulcanizing machine having precisely the construction of electrically and independently heated rolls shown in mechanism X′. The rolls A′, A′, revolve at the same rate of speed as the lower series Y′ of the rolls of the drying and compressing mechanism.

To this mechanism however are added the pressure rolls $A^{15}$, $A^{15}$ and also are added injector nozzles $A^2$, $A^2$, which inject pumice stone on the outer side of additional layers $A^9$, $A^9$ of adhesive vulcanizing material which is fed by roller guides $A^8$, $A^8$ to the roller and compressed upon the band.

In Figs. 3 and 4ᵃ additional sets of heater rollers $A^5$, $A^5$ are shown through which another band can be passed simultaneously thus doubling the capacity of the machine for production; also other sets of heated rollers can be added if desired.

Having described the invention, what I claim as new and desire to secure by Letters Patent is:

1. The hereinbefore described process of continuously manufacturing coated vulcanized fabrics rubbered from fabric bands and vulcanizable coatings thereon consisting in first coating a fabric band with said liquid vulcanizable adhesive, passing the same in an unvulcanized condition over a series of separately heated and heat controlled units at a temperature below that of vulcanizing to evaporate the solvents in the coating and partially solidify the same next passing the band over a carrier to expose it to atmospheric action to further dry and harden the same, thence passing it through a current of heated air and compressing it to desired thickness to eliminate solvents therefrom and finally passing the band over a series of separately heated units and under pressure at the vulcanizing temperature.

2. The described process of continuously manufacturing vulcanized rubber fabrics from fabric bands coated with liquid adhesive consisting in first coating the bands with said liquid adhesive, next passing said coated band continuously over a succession of separately heated heating units to eliminate the solvents by direct application of heat to the travelling band, next exposing the band to the air to dry and harden the same, further drying the same under pressure to eliminate enclosed solvents, and finally adding additional coatings thereto by compression and continuously vulcanizing the product by passing the same over a series of separately heated units under pressure.

3. The described process of continuously vulcanizing a coated fabric band comprising passing said coated band over closely approximated rolls heated to the vulcanizing point by applying opposite sides of said band alternately to said heated rolls and simultaneously applying pressure to said band as it passes some of said rolls.

4. The heretofore described process of continuously vulcanizing adhesive vulcanizable fabric consisting in separately heating the rolls in a series of rolls to the vulcanizing temperature applying the sides of said fabric alternately to the peripheries of said rolls, said rolls being closely approximated together to prevent leaving spaces between vulcanized parts of said material.

5. The hereinbefore described continuous process of vulcanizing rubbered materials consisting in first heating a series of closely adjacent rolls to a vulcanizing temperature and passing the rubbered material continuously over said rolls the upper and lower sides of said rubbered material being presented to said rolls and simultaneously applying pressure to said rubbered material.

6. In a device for continuously vulcanizing elongated rubbered material a series of rolls over which the unvulcanized rubber materials are passed, opposite sides of all the goods alternately engaging said rolls, and means for applying a controllable vulcanizing degree of heat to said rubbered goods.

7. In a device for continuously vulcanizing rubbered goods, a series of heated rolls over which the vulcanized rubbered goods are passed, the opposite sides of said goods alternately engaging said rolls, said rolls being closely approximated together, to prevent the passage of vulcanizing parts, a heating unit in each roll, electric connections for said unit in each roll, a regulator for each heating unit and a main circuit in which all the heating units are included.

8. In a continuously acting vulcanizing machine a multiple number of rolls over which the vulcanized material is passed the opposite sides of said unvulcanized material alternately engaging said rolls, said rolls being approximated together, means for separately heating said rolls to a vulcanizing temperature, and for applying pressure to the material while passing through said rolls.

9. In a continuously acting vulcanizing machine for a fabric band, a frame, a multiple number of rolls over which said band passes in turn, adjacent rolls being closely approximated to contact with opposite sides of said band as it passes over them, a separately adjustable heating unit in each roll, pressure rolls engaging the band on one of the heated rolls, and means for separately controlling the temperature of each heating unit.

10. In a continuously acting machine for the purposes set forth, multiple sets of rolls over which a multiple number of coated bands are passed, and supporting and driving means therefor, a heating unit in each roll, and separate means for adjusting the temperature of each heating unit.

11. In a machine for continuously treating a coated fabric, a coating means, a preliminary heating means for evaporating solvents, means for exposing the coated fabric to the atmosphere, a drying and solidifying means, and a continuously acting vulcanizing means.

12. In a machine of the character described, a drying and solidfying means comprising upper and lower groups of rolls, between which a coated band is passed, and a heating means intermediate of the rolls in each group, over which said band is passed.

13. In a continuous acting vulcanizing machine for a fabric band, a frame, a multiple number of rolls over which said band passes in turn, adjacent rolls being closely approximated together to make contact with opposite sides of said band as it passes over them, a separately electric heating unit in each roll, pressure rolls engaging the band on one of the heated rolls, and means for separately controlling the temperature of each heating unit.

14. In a contiuously acting machine for the purposes set forth, multiple sets of rolls over which a multiple number of coated bands are passed and supporting and driving means therefor, an electric heating unit in each roll, and separate means for adjusting the temperature of each electric heating unit.

15. In a machine for continuously treating a coated fabric, a coating means a preliminary heating means for evaporating solvents, means exposing the coated fabric to the atmosphere, a drying and solidifying means, and a continuously acting electrically operated vulcanizing means.

16. In an electrically operated vulcanizer for a coated band, a multiple number of rolls with which opposite sides of said band alternately make contact electrically operated means for separately heating the circumferential surfaces of said rolls.

17. In an electrically operated vulcanizer for a coated band, a multiple number of rolls with which opposite sides of said band alternately make contact electrically operated means for separately heating and circumferential surfaces of said rolls and means for controlling the temperature of each roll.

18. Th process of continuously vulcanizing a coated band by means of electricity consisting in moving the band continuously over a succession of heated metallic surfaces opposite sides of said band alternately making contact with spaced heated surfaces.

19. The hereinbefore described continuous process for treating a coated band consisting in passing the same between electrically heated rolls to eliminate the solvents therein next exposing the band to the atmosphere to dry the same passing the band over a heating table and compressing the same to dry and solidify the same giving the exterior surfaces an additional coating and passing the band over a second drying and compressing table and finally passing the same between electrically heated rolls to which the opposite sides of the band are alternately exposed and simultaneously compressing the band.

In testimony whereof, I hereunto set my hand this 21" day of August, 1919.

LAWRENCE A. SUBERS.

In presence of—
P. F. WILLS,
C. H. ROTH.